(12) United States Patent
Gruber et al.

(10) Patent No.: US 10,850,560 B2
(45) Date of Patent: Dec. 1, 2020

(54) AXLE END ASSEMBLY COMPRISING A WHEEL HUB UNIT AND A WHEEL BRAKE

(71) Applicant: KNORR-BREMSE Systeme fuer Nutzfahrzeuge GmbH, Munich (DE)

(72) Inventors: Markus Gruber, Ebersberg (DE); Robert Trimpe, Wessling (DE); Edgar Ruhl, Ingolstadt (DE); Witold Kolodziejcak, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 70 days.

(21) Appl. No.: 16/235,040

(22) Filed: Dec. 28, 2018

(65) Prior Publication Data

US 2019/0135033 A1     May 9, 2019

Related U.S. Application Data

(63) Continuation of application No. PCT/EP2017/064476, filed on Jun. 14, 2017.

(30) Foreign Application Priority Data

Jun. 30, 2016     (DE) .................. 10 2016 111 942

(51) Int. Cl.
   *B60B 27/06*     (2006.01)
   *F16D 65/12*     (2006.01)
   (Continued)

(52) U.S. Cl.
   CPC ........ *B60B 27/0052* (2013.01); *B60B 27/001* (2013.01); *B60B 27/06* (2013.01);
   (Continued)

(58) Field of Classification Search
   CPC . B60B 27/0052; B60B 27/06; B60B 27/0063; B60B 27/065; B60B 2310/302;
   (Continued)

(56) References Cited

U.S. PATENT DOCUMENTS

| 1,001,905 A | * | 8/1911 | Tuller | ..................... B60B 35/00 301/132 |
| 2,480,833 A | * | 9/1949 | Buckendale | ............ B60B 35/16 74/607 |

(Continued)

FOREIGN PATENT DOCUMENTS

| CN | 1689899 A | 11/2005 |
| CN | 201245141 Y | 5/2009 |

(Continued)

OTHER PUBLICATIONS

Chinese-language Office Action issued in counterpart Chinese Application No. 201780040767.9 dated Dec. 10, 2019 with partial English translation (13 pages).

(Continued)

*Primary Examiner* — Thomas J Williams
(74) *Attorney, Agent, or Firm* — Crowell & Moring LLP

(57) ABSTRACT

An axle end assembly has a wheel brake arrangement and a wheel hub arrangement. The assembly is designed as a preassembled unit with a hollow shaft element on which the wheel brake arrangement and the wheel hub arrangement are disposed.

25 Claims, 16 Drawing Sheets

(51) Int. Cl.
   *F16D 55/2255* (2006.01)
   *B60B 27/00* (2006.01)
   *F16D 55/22* (2006.01)
   *B60T 1/06* (2006.01)
   *F16D 55/226* (2006.01)
   *F16D 55/36* (2006.01)
   *F16D 65/18* (2006.01)
   *F16D 65/02* (2006.01)
   *F16D 121/04* (2012.01)

(52) U.S. Cl.
   CPC .............. *B60T 1/065* (2013.01); *F16D 55/22* (2013.01); *F16D 55/226* (2013.01); *F16D 55/2255* (2013.01); *F16D 55/36* (2013.01); *F16D 65/123* (2013.01); *F16D 65/18* (2013.01); *B60B 2310/302* (2013.01); *B60B 2310/305* (2013.01); *B60B 2900/113* (2013.01); *B60T 2270/10* (2013.01); *F16D 2065/1384* (2013.01); *F16D 2065/1388* (2013.01); *F16D 2121/04* (2013.01); *F16D 2250/0061* (2013.01); *F16D 2250/0076* (2013.01); *F16D 2250/0084* (2013.01)

(58) Field of Classification Search
   CPC ....... B60B 2310/305; F16D 2065/1384; F16D 2065/1388; F16D 2250/0061; F16D 2250/0076
   See application file for complete search history.

(56) References Cited

U.S. PATENT DOCUMENTS

| | | | |
|---|---|---|---|
| 2,773,552 A | 12/1956 | Schjolin et al. | |
| 3,715,935 A * | 2/1973 | Ebey | F16H 57/023 74/607 |
| 6,543,858 B1 * | 4/2003 | Melton | B60B 27/00 301/137 |
| 6,889,802 B2 * | 5/2005 | Hamperl | B60B 35/121 188/17 |
| 10,308,070 B1 * | 6/2019 | Carroll | B60B 35/14 |
| 2005/0230199 A1 | 10/2005 | Takizawa et al. | |
| 2012/0247881 A1 | 10/2012 | Root et al. | |
| 2015/0084397 A1 * | 3/2015 | Kudo | B60B 27/0015 301/6.5 |
| 2016/0069394 A1 | 3/2016 | Ogata | |

FOREIGN PATENT DOCUMENTS

| | | |
|---|---|---|
| CN | 201283749 Y | 8/2009 |
| CN | 202080066 U | 12/2011 |
| DE | 296 01 870 U1 | 8/1996 |
| DE | 201 21 339 U1 | 8/2002 |
| DE | 101 21 862 A1 | 11/2002 |
| DE | 103 40 471 A1 | 3/2004 |
| DE | 10 2008 050 280 A1 | 4/2010 |
| DE | 10 2012 208 920 A1 | 12/2013 |
| JP | 2004-150485 A | 5/2004 |
| KR | 10-2004-0003547 A | 1/2004 |
| WO | WO 2014/168223 A1 | 10/2014 |
| WO | WO 2015/052553 A1 | 4/2015 |

OTHER PUBLICATIONS

International Preliminary Report on Patentability (PCT/IB/326 & PCT/IB/373) issued in PCT Application No. PCT/EP2017/064476 dated Jan. 10, 2019, including English translation of document C2 (German-language Written Opinion (PCT/ISA/237 previously filed on Jan. 4, 2019)) (nine (9) pages).
International Search Report (PCT/ISA/210) issued in PCT Application No. PCT/EP2017/064476 dated Sep. 27, 2017 with English translation (seven pages).
German-language Written Opinion (PCT/ISA/237) issued in PCT Application No. PCT/EP2017/064476 dated Sep. 27, 2017 (six pages).
German-language Office Action issued in counterpart German Application No. 10 2016 111 942.3 dated Feb. 27, 2017 (five pages).

* cited by examiner

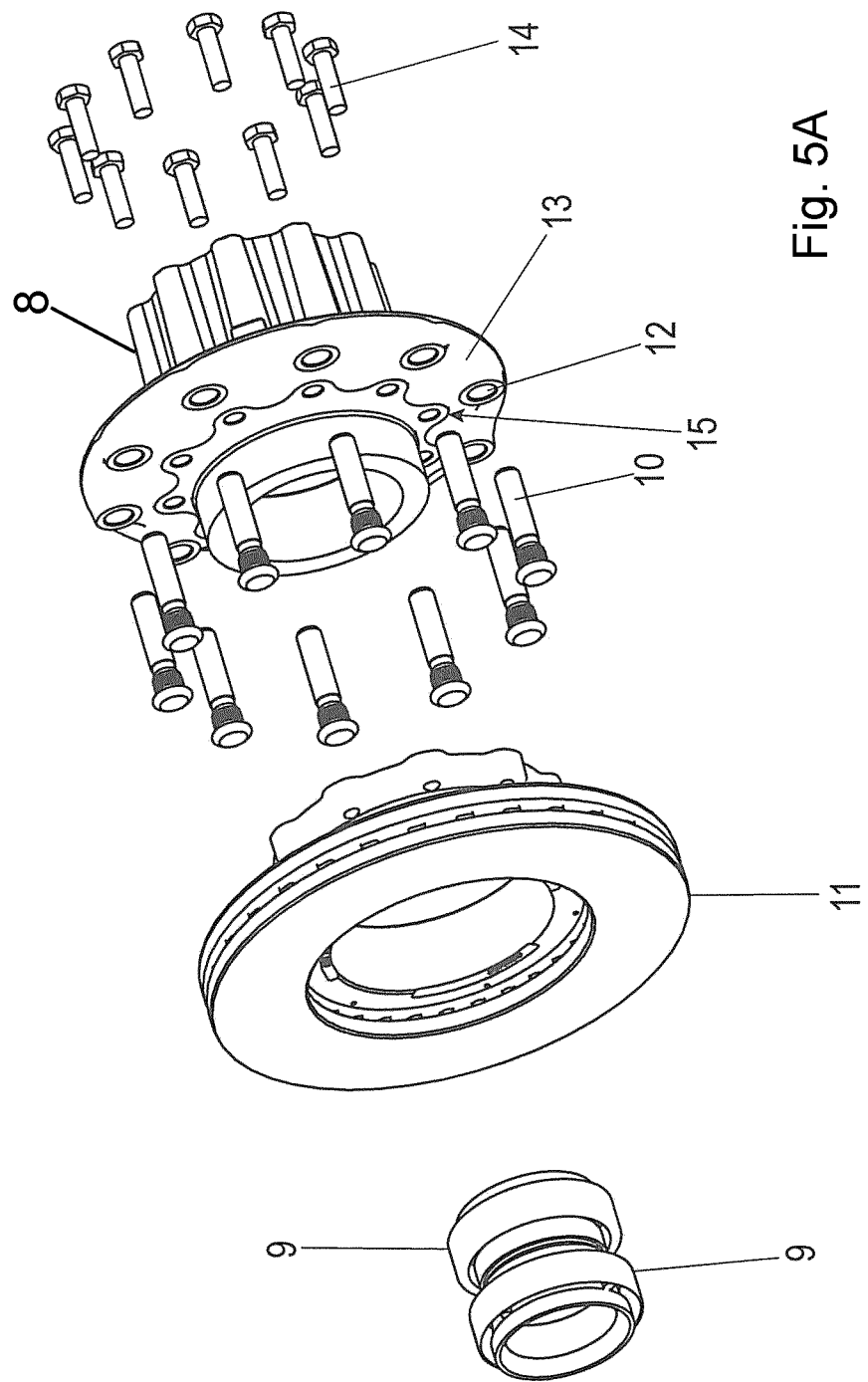

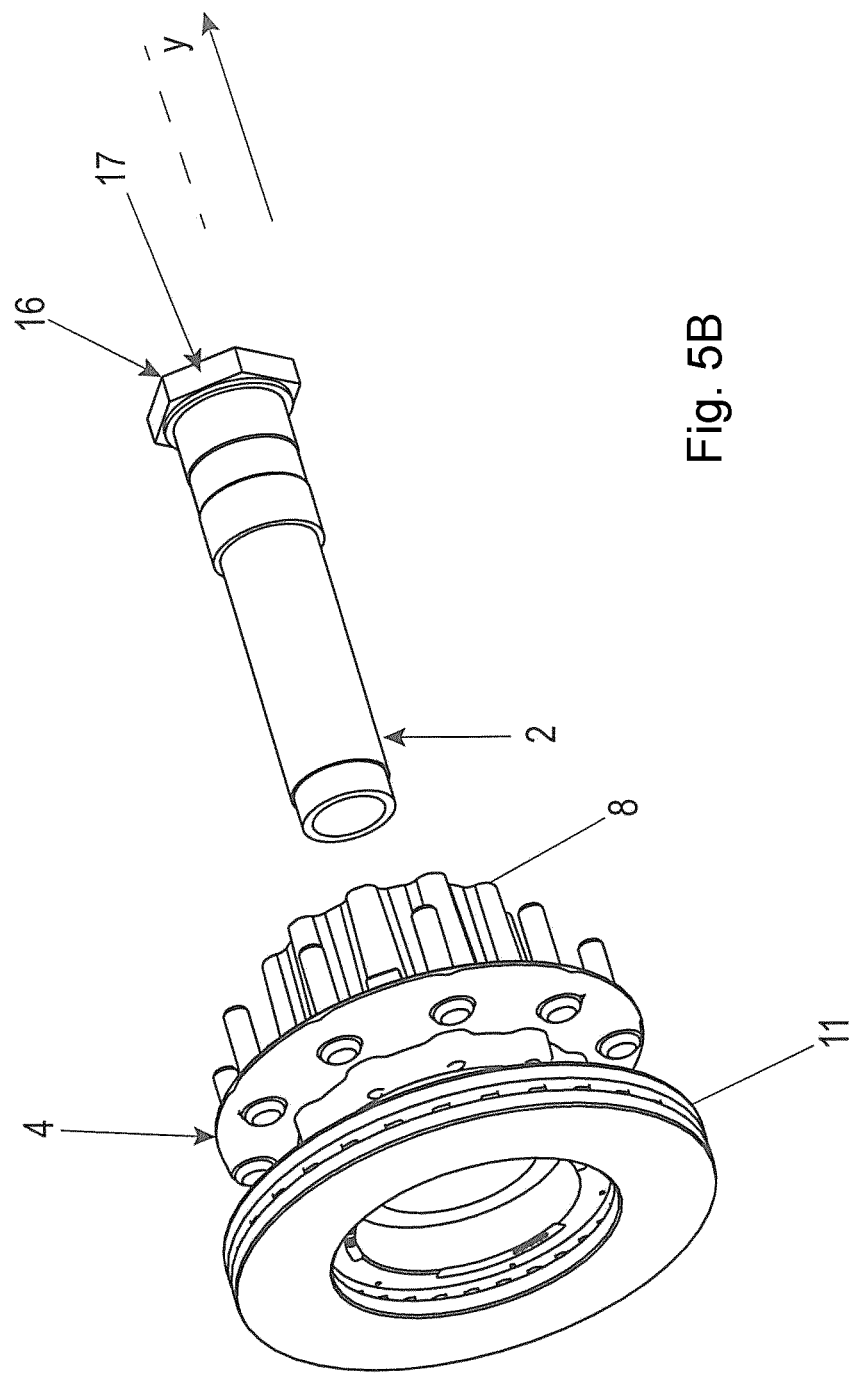

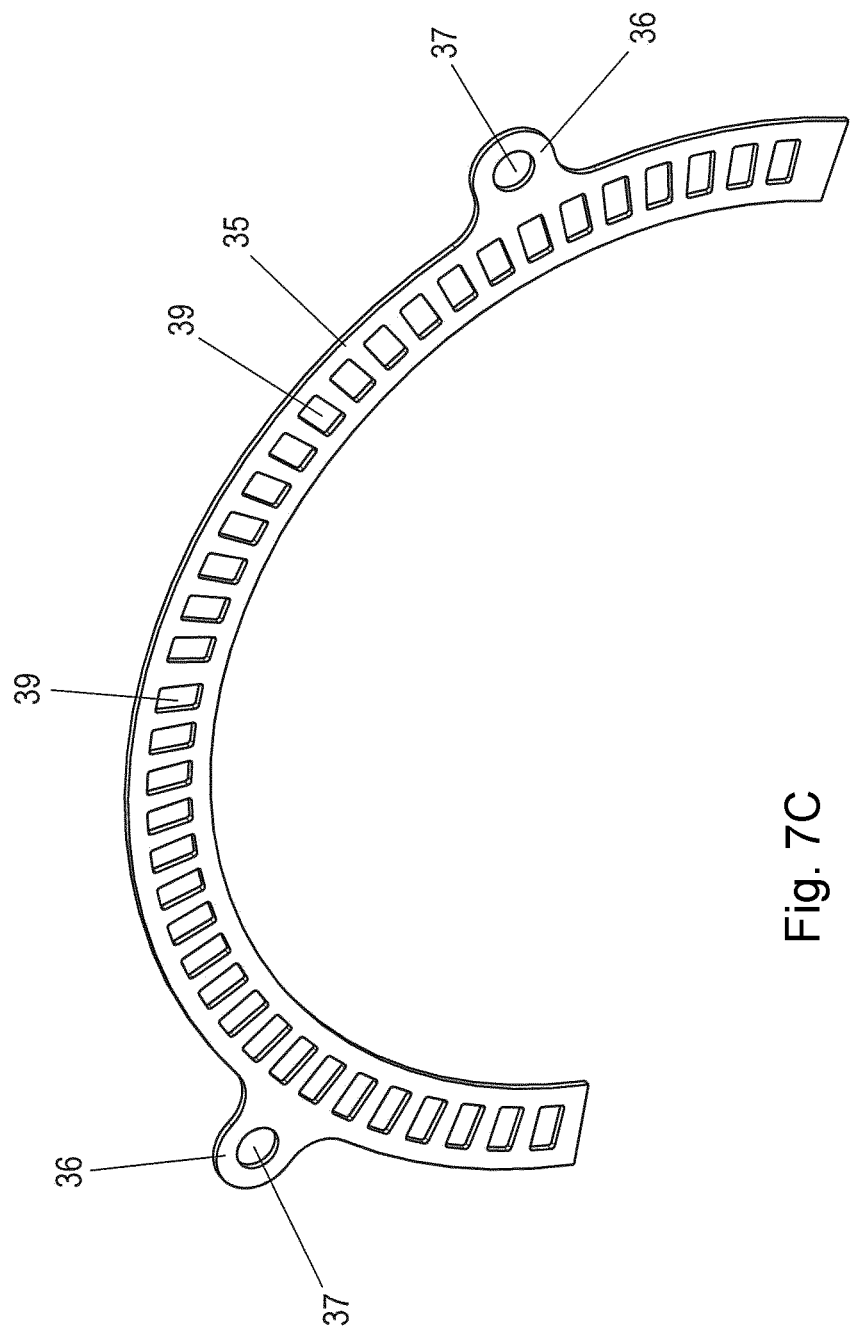

AXLE END ASSEMBLY COMPRISING A WHEEL HUB UNIT AND A WHEEL BRAKE

CROSS REFERENCE TO RELATED APPLICATIONS

This application is a continuation of PCT International Application No. PCT/EP2017/064476, filed Jun. 14, 2017, which claims priority under 35 U.S.C. § 119 from German Patent Application No. 10 2016 111 942.3, filed Jun. 30, 2016, the entire disclosures of which are herein expressly incorporated by reference.

BACKGROUND AND SUMMARY OF THE INVENTION

The invention relates to an axle end assembly for a vehicle or for a vehicle wheel axle, comprising a wheel brake arrangement and a wheel hub arrangement. The invention further relates to a wheel axle unit and to a method for mounting the wheel axle unit.

Wheel brakes of commercial vehicles are assembled together with other components on a steering stub axle (front axle, "FA" for short) or on an axle (rear axle, "RA" for short), to form what is known as a "wheel end". In this case, various individual steps are required during the axle vehicle mounting.

A known method for mounting axles on commercial vehicles comprises for example the following steps:
connecting an axle stub to an axle body of a vehicle, usually by friction welding;
attaching a brake adapter or generally a brake carrier flange to the axle body (by welding or screwing);
pressing wheel bolts into a wheel hub;
pressing a wheel bearing into the wheel hub;
flange-mounting a brake disc on the wheel hub;
fitting a hub arrangement onto the axle stub and tightening with a central nut;
inserting a drive shaft and flange-mounting on the hub; and
screwing a disc brake onto the brake carrier flange.

This mounting of the components on the axle body causes the problem that individual heavy components have to be positioned relatively precisely relative to one another and interconnected in part by screw connections. The accessibility for screw connection by way of mass-produced torque tools is partially restricted and can therefore take place generally only by use of special tools.

The axle body is the largest and heaviest part of the axle. The periphery thereof is usually square or rectangular and therefore can be mounted on the solid mounting stands only in four positions. Said body is substantially rotatable only about the longitudinal axis. However, the mounted position of the disc brake is dependent on the whole vehicle and is not determined by the square cross section. Therefore, complex mounting devices are not required when joining the brake.

The wheel brake—in particular in one configuration as a disc brake—can be fitted in an exclusively radial manner to conclude the mounting. This carries the risk of the pads being damaged on the edges during the mounting. The use of interlocking elements in the interface region is also not possible, since otherwise, in the event of repairs, the brake could no longer be dismounted.

As a result of the necessary mounting sequence, interlocking solutions cannot be implemented or can be implemented only partially when designing the interfaces.

Against this backdrop, the invention addresses the problem of providing an easily mountable axle end assembly, comprising a wheel brake arrangement and a wheel hub arrangement, an accordingly improved wheel axle unit, and an improved method for mounting the wheel axle unit.

According to the invention, an axle end assembly, comprising a wheel brake arrangement and a wheel hub arrangement is provided which is characterized in that the axle end assembly is in the form of a pre-mounted unit which has a hollow shaft element, on which the wheel brake arrangement and the wheel hub arrangement are arranged. The hollow shaft element then preferably penetrates the wheel brake arrangement and the wheel hub arrangement, in particular completely in the axial direction. In this way, the axle end assembly forms a completely pre-mounted "wheel end", the individual components of which are firstly compiled to form a pre-mounted unit. This pre-mounted unit can then be mounted in a simple and secure manner at one end of the axle body of the vehicle axle of the vehicle. It is particularly advantageous for the wheel brake arrangement to also belong to the pre-mounted unit. In particular when the wheel brake is a disc brake, the mounting of this relatively large assembly is thus considerably simplified.

It is particularly advantageous for the hollow shaft element to be designed to be connected to a first end of an axle body of a vehicle axle. The mounting of the pre-mounted unit on the axle body is then thus particularly simple. This applies in particular when the hollow shaft element has a threaded portion on the one axial end thereof, which portion is designed to be screwed together with a corresponding threaded portion of the axle body.

It is further advantageous for the wheel hub arrangement to comprise at least one wheel hub and one or more wheel bearings. It is even more advantageous for the wheel hub arrangement to further comprise a plurality of wheel bolts and/or a brake disc.

According to an additional variant, it is provided that the pre-mounted unit further comprises a spacer sleeve which is attached to the hollow shaft element on the wheel hub.

It is further expedient for the wheel brake arrangement of the pre-mounted unit to comprise at least one brake adapter for mounting a wheel brake, in particular a disc brake. The brake adapter can be designed for mounting a brake carrier or directly for mounting a brake caliper so that the adapter takes over the brake carrier function itself. In this respect, the brake adapter is preferably designed in the manner of an assembly plate which is penetrated by the hollow shaft element and which extends substantially perpendicularly to the hollow shaft element or the axial direction Y thereof. The wheel brake arrangement preferably also comprises the wheel brake, i.e. preferably the disc brake having the brake caliper and preferably a brake cylinder and optionally a brake carrier. An ABS sensor and a rotor can also be added or provided in this case. Preferably, securing against axial slipping of one or more of these parts is provided.

It is further advantageous for a direct torque transmission interface to be provided between the brake adapter and the axle body to achieve the transmission of forces directly from the wheel brake into the axle body.

The invention also provides a wheel axle unit, comprising an axle body, to which at least one axle end assembly is attached, as well as a method for mounting a wheel axle unit, wherein firstly an axle end assembly is formed as a pre-mounted unit, and wherein the pre-mounted unit is then mounted as a whole on the axle body. The method allows a particularly simple and secure construction of the vehicle axle.

Other objects, advantages and novel features of the present invention will become apparent from the following

BRIEF DESCRIPTION OF THE DRAWINGS

FIGS. 5A-5E show a mounting of an axle end assembly to form a pre-mounted unit in five steps in this case.

FIGS. 7C-7D are perspective views of two individual components of the arrangement of FIG. 7A.

DETAILED DESCRIPTION OF THE DRAWINGS

Figure 5C:
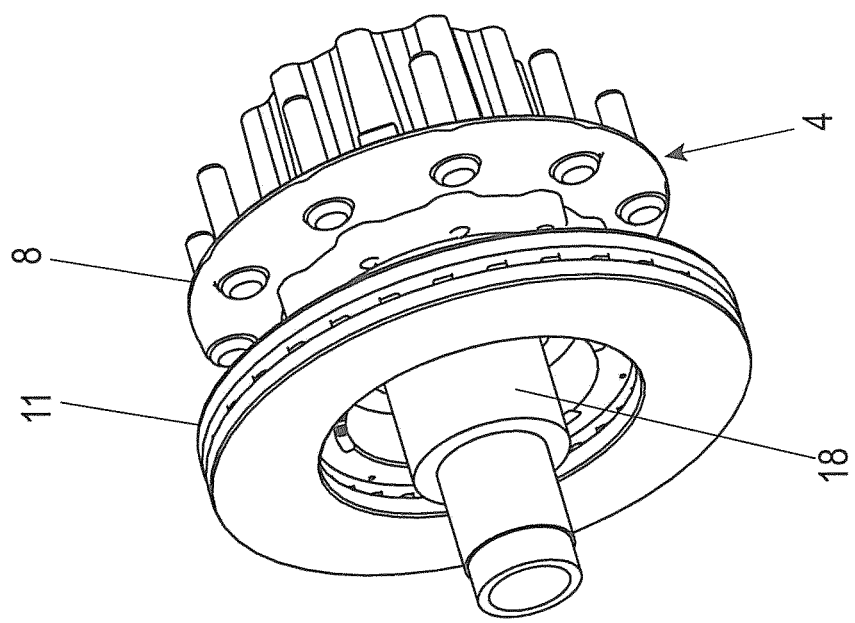
Figure 5D:
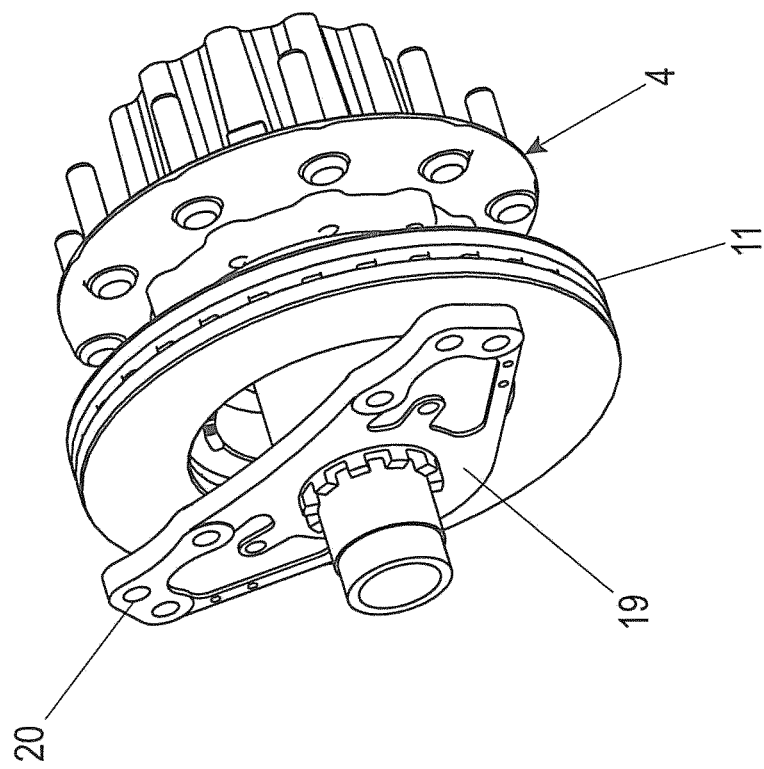
Figure 5E:
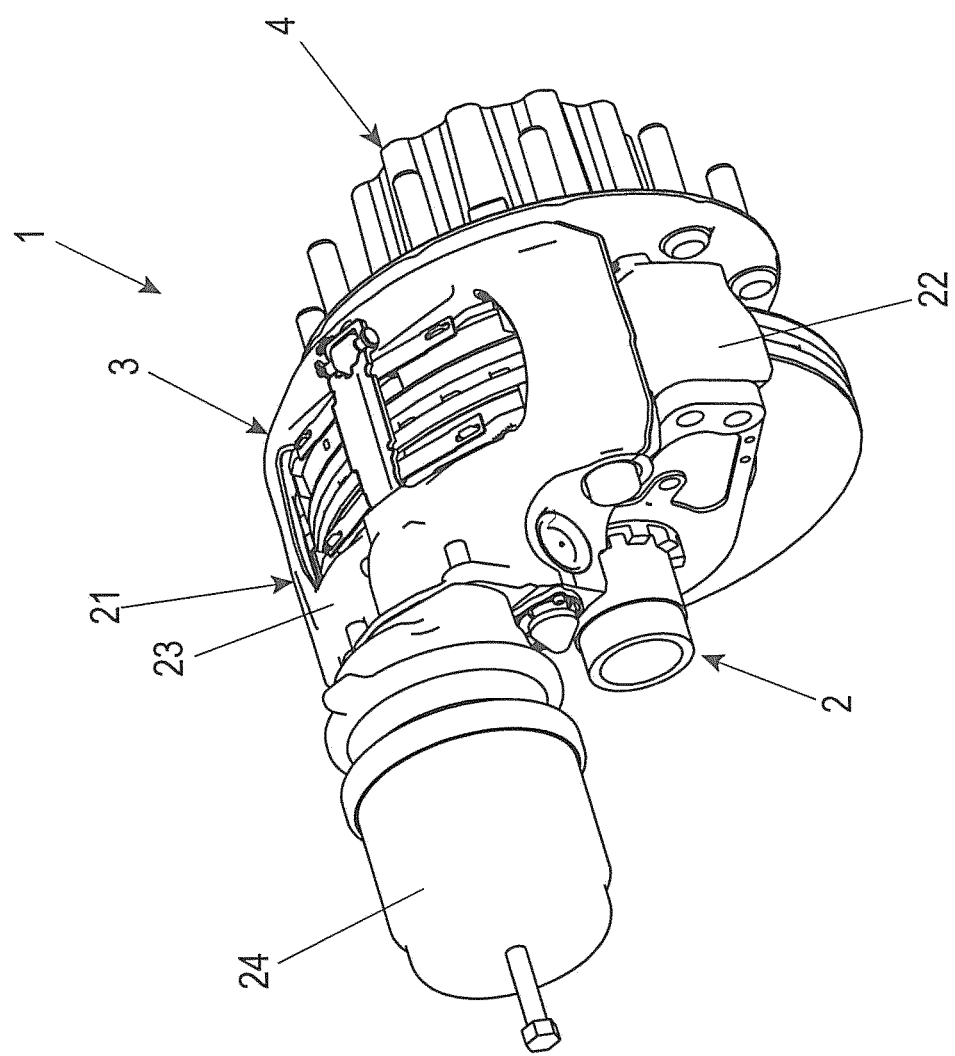

FIG. 5E shows an axle end assembly 1 (also referred to as a "wheel end"), which is in the form of a pre-mounted unit which comprises a hollow shaft element 2, on which a wheel brake arrangement 3 and a wheel hub arrangement 4 are arranged.

Figure 5F:
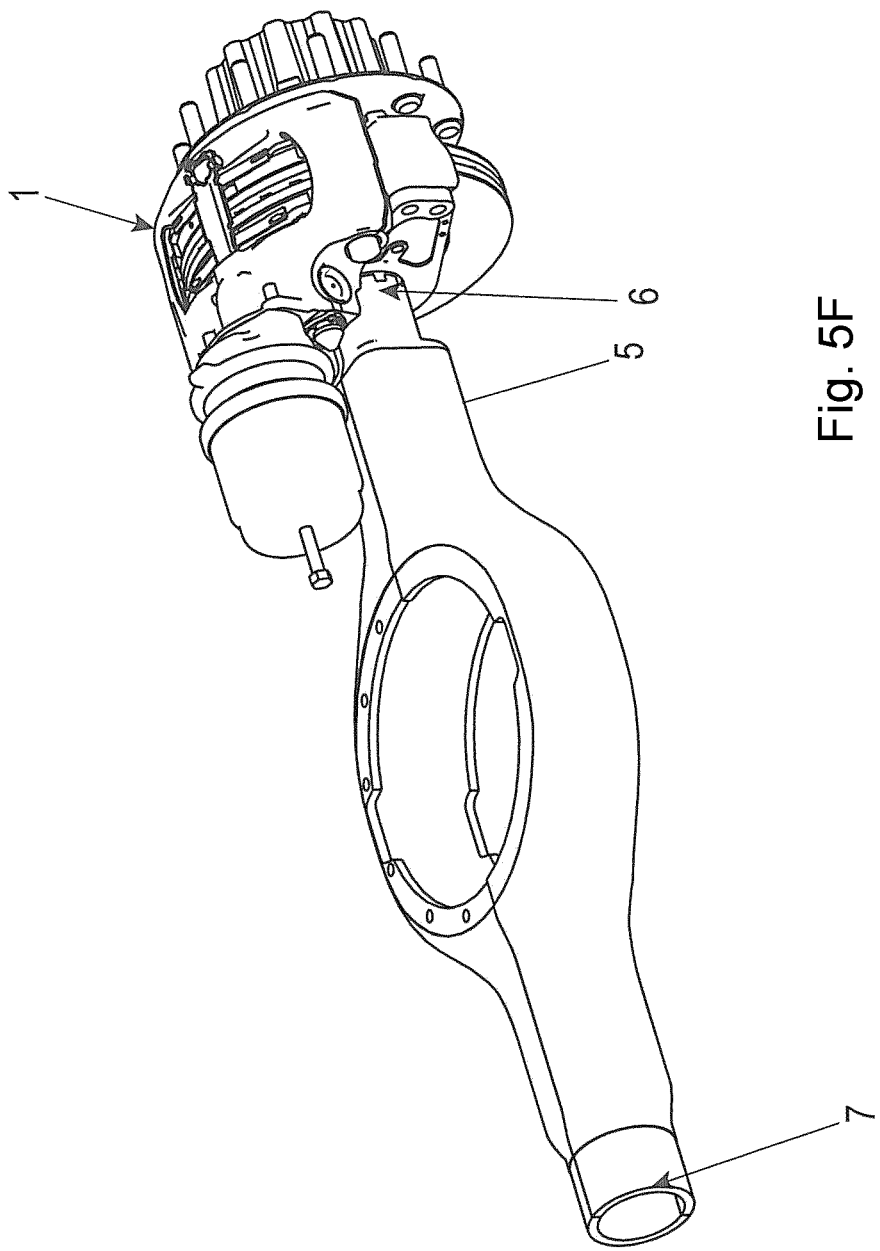
FIG. 5F shows the axle end assembly mounted on an axle body.

The hollow shaft element 2 in turn is designed to be connected to a first end 6 of an axle body 5 of a vehicle axle which does not rotate during driving, as can be seen in FIG. 5F. The second opposite end 7 of the axle body 6 can be connected to an additional axle end assembly in the manner of the assembly 1.

It is particularly advantageous for the axle end assembly, together with the two main sub-assemblies "wheel brake" and "wheel hub", to form a pre-mounted unit which can be pre-mounted in a simple manner, wherein very good accessibility to the components of the axle end assembly 1 from all sides is ensured, and wherein said pre-mounted assembly in turn can then be mounted simply and rapidly on the axle body 5.

In the following, it will firstly be explained on the basis of FIG. 5A to 5E how for example the axle end assembly 1 can be assembled or mounted from individual components.

In this case, the mounting is divided into five main mounting steps A) to E). Said steps can each again have mounting sub-steps. The selected sequence of the five steps A) to E) is advantageous and simple. However, said sequence is not compulsory, but rather can be varied within the scope of the invention.

The first mounting step A—see FIG. 5A—involves pre-mounting of the wheel hub arrangement 4.

In this case, the wheel hub arrangement 4 comprises at least the following: a wheel hub 8, one or more wheel bearings (rolling bearings) 9, a plurality of wheel bolts 10 and a brake disc 11. In this case, the wheel bearings 9 are arranged on the inner periphery of the wheel hub 8. The wheel bolts 10 are inserted in holes 12 in the wheel mounting flange 13 of the wheel hub 8 so as to be distributed over the periphery. In addition, the brake disc 11, which in this case is in the form of a cupped brake disc, is fixed to the wheel hub 8 (in this case by screws 14 at holes 15) so that said brake disc can be rotated together with the wheel hub 8. The wheel hub arrangement 4 comprises, after the pre-mounting thereof, a central through-opening which, in the mounted state, is aligned with the axial direction Y of the axle which corresponds to the axis of rotation.

The second mounting step B—see FIG. 5B—is a threading/fitting of the wheel hub arrangement 4 from step A) onto a hollow shaft element 2, which then penetrates the central opening of the wheel hub arrangement 4.

The hollow shaft element 2 can comprise regions having different diameters so that annular shoulders are formed on the hollow shaft element 2. In this case, an annular collar 16 is formed externally at one end of the hollow shaft element 2 in the form of an axial stop. On the outer periphery thereof, said annular collar 16 is additionally formed in the manner of a torque transmission contour 17—for example in the manner of an external polygon.

The third mounting step C—see FIG. 5C—is a threading of a spacer sleeve 18 onto the hollow shaft element 2. The spacer sleeve 18 preferably axially penetrates the entire brake disc 11. This mounting step is optionally required when a spacer sleeve 18 is provided, which is provided in the exemplary embodiment in FIG. 1, but which for example is not the case in the exemplary embodiment in FIG. 2. This will be described in greater detail further below.

The fourth mounting step D—see FIG. 5D—is a threading of a brake adapter 19 belonging to the wheel brake arrangement for mounting a wheel brake, in particular a disc brake.

The brake adapter 19 can be formed in the manner of a plate which extends substantially perpendicularly to the axial direction Y. The adapter can be used for example to attach a brake carrier thereto at mounting openings 20, on which carrier a brake caliper, for example a sliding caliper, is then mounted. The adapter can also be used directly to attach a brake caliper, for example a fixed caliper disc brake or a sliding caliper.

The fifth mounting step D—see FIG. 5E—involves the mounting of a wheel brake on the brake adapter 19. In this case, the wheel brake is a disc brake 21 belonging to the wheel brake arrangement 3. The disc brake 21 in this case comprises a brake carrier 22, a brake caliper 23, and preferably a brake actuator, in this case a brake cylinder 24. In the brake caliper 23, brake pads and a brake application unit are arranged (not shown here). On this disc brake 21, an ABS sensor and a rotor (with a radial or axial design, not shown here), and optionally additional components such as an electronics unit can also be provided.

Overall, in four or five steps A, B and D, E or A to E, the axle end assembly 1 is completed by the hollow shaft element 2, on which the wheel brake arrangement 3 and the wheel hub arrangement 4 are arranged, to form the pre-mounted unit, which can then be attached as a whole to the axle body 5.

Preferably, securing against axial slipping of the components of the pre-mounted unit is provided.

Figure 1:
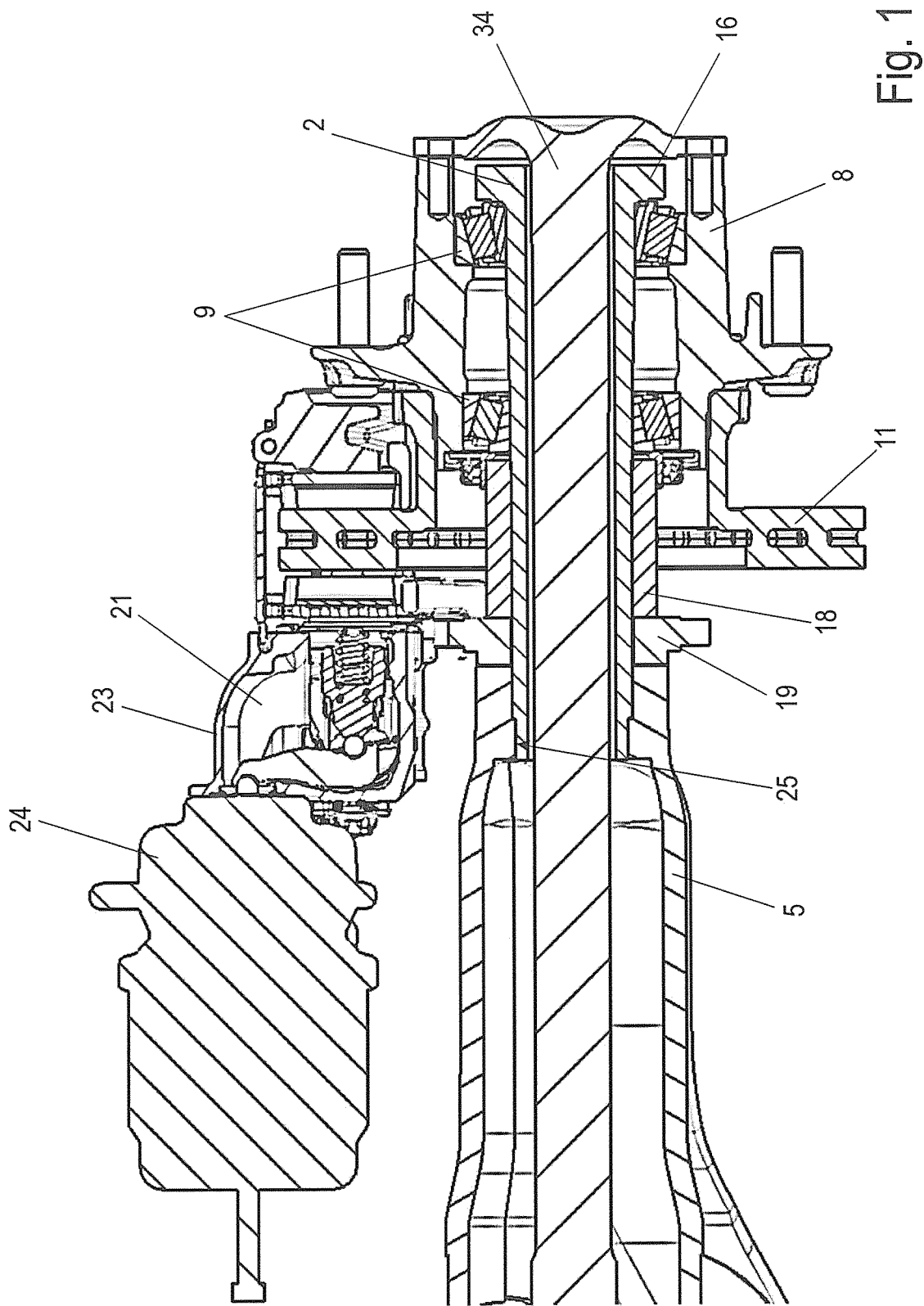
FIG. 1 is a sectional view through a first arrangement, comprising an axle end assembly according to the invention, mounted on an axle body.
Figure 2A:
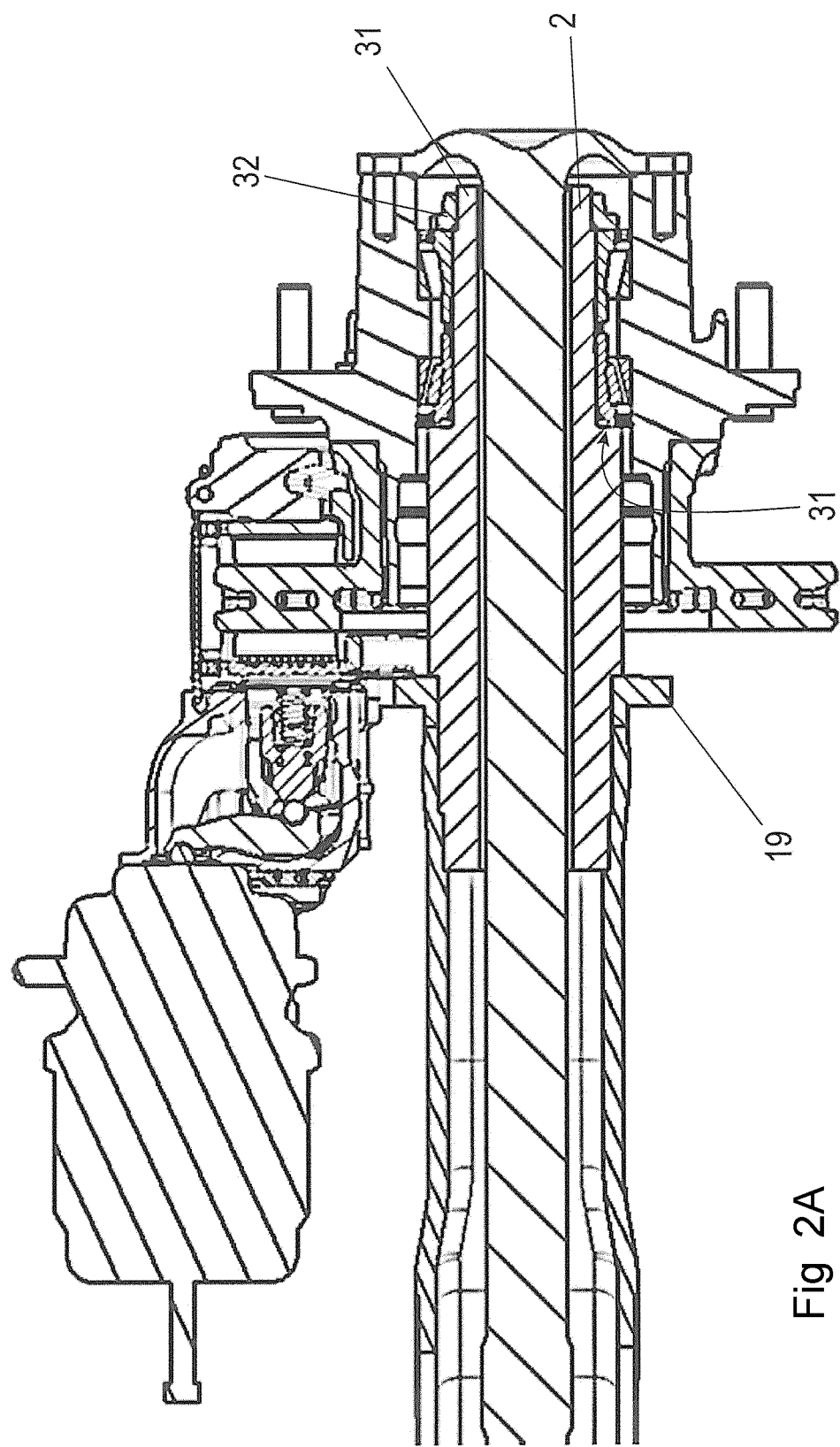
FIG. 2A is a sectional view through a second arrangement, comprising a second axle end assembly according to the invention, mounted on an axle body.
Figure 2B:
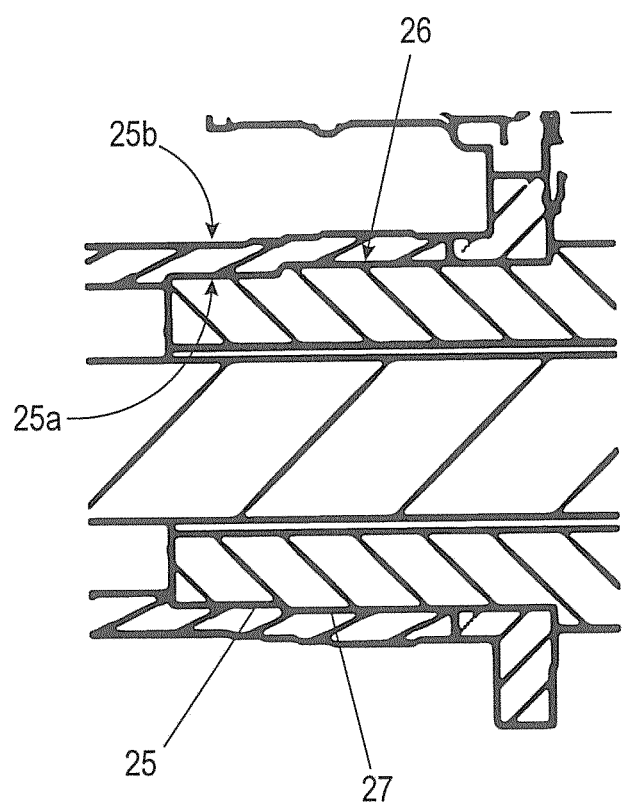
FIG. 2B is an enlarged detail from FIG. 2A.

After the pre-mounting, during the axle mounting, the entire pre-mounted unit is connected to the axle body 5. This can occur for example by screwing to a thread 25 (FIGS. 1, 2A, 2B). Preferably, for this purpose, the hollow shaft 2 comprises a threaded portion 25a (in this case an outer thread), which can be screwed or also is screwed together with a corresponding threaded portion 25b (in this case an inner thread) of the axle body 5.

The components of the pre-mounted unit can thus be interconnected beforehand and, as a combined unit 1, attached to the axle body 5. The axle body 5 is located further in on the vehicle axle than the pre-mounted unit, which virtually forms the brake end thereof (also referred to as the "wheel end").

The interface of the pre-mounted unit 1 (axle portion with brake, brake disc, wheel bearing) comprises, in addition to the threaded portion 25a, preferably at least one non-threaded guide portion 26 which is joined thereto on the one free end thereof. The guide portion can have a slightly larger diameter than the threaded portion 25a. The axle body 5 is then formed to correspond thereto.

During the mounting, the guide portion 26 of the hollow shaft element 2 thus firstly comes into contact with a corresponding interface region 27 of the axle body 5, and a guide is formed before the threaded portions 25a, 25b then come into contact, and the hollow shaft element 2 of the pre-mounted unit is securely connected to the axle body 5 by screwing (see FIG. 2B). The mounting is thus particularly simple and secure.

Preferably, a direct torque transmission interface is also provided between the brake adapter 19 and the axle body 5, formed by accordingly corresponding interlocking elements which engage with one another during the mounting of the pre-mounted unit 1 on the axle body.

However, the interface between brake carrier and axle can also be formed integrally, for example by additional welding during the mounting of the pre-mounted unit on the axle body 5.

Figure 3:
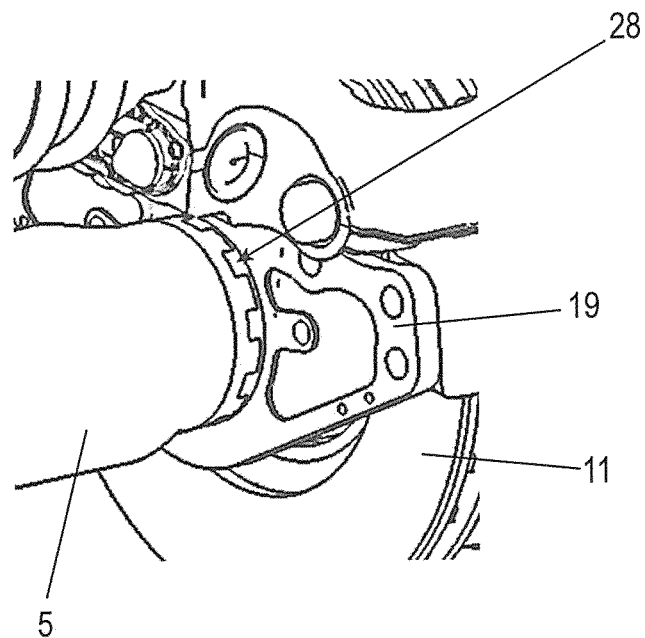
FIG. 3 is a perspective view of a portion of an arrangement in the manner of FIG. 1.
Figure 4:
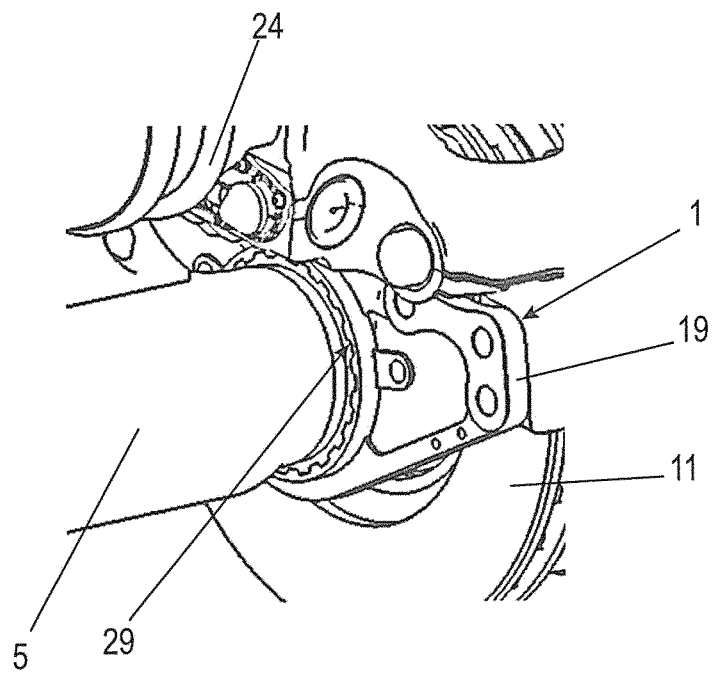
FIG. 4 is a perspective view of a portion of an arrangement in the manner of FIG. 2.

To achieve an interlocking connection as an additional securing against rotation, the connection between the axle body 5 and the brake adapter comprises, according to one advantageous variant, a radially formed toothing 28 (FIG. 3), or according to another advantageous variant, an axially formed toothing 29 (FIG. 4) between the axle body 5 and the brake adapter 19 in each case. Said toothing 28, 29 is formed in each case in such a way that the moments and forces occurring during braking are transmitted directly from the brake adapter 19 to the axle body 5. As a result, in a simple and secure manner, a release of the connection between the axle body 5 and the pre-mounted unit 1 is prevented, and a secure torque support is achieved directly on the axle body 5.

In one embodiment (FIG. 2), the hollow shaft element 2 comprises an outer thread 30 on the side which is opposite the interface to the axle body. After positioning the wheel bearing 9 against a stop 31 of the hollow shaft element 2, by means of a central nut 32 on the outer thread 30, a suitable pretension can be applied to the wheel bearing 9.

Alternatively to the outer thread, the hollow shaft element 2 comprises, on the side which is opposite the interface to the axle body, the annular collar 16 (FIG. 1), against which the wheel bearing 9 rests in the mounted state. A pretension is applied to the wheel bearing(s) 9 by means of the screwing together of the pre-mounted unit and the axle body 5.

In one embodiment, the hollow shaft element 2 further comprises, on the side which is opposite the interface to the axle body, the torque transmission contour 17 as a tool interface, for example an internal or external polygon or another suitable interface for the torque transmission, in order to achieve the screwing together of the hollow shaft element 2 and the axle body 5 (FIG. 5B).

When in the assembled state, the hollow shaft element 2 and the axle body 5 can be penetrated in full or in part by an axle part 34 which is fastened in a rotationally fixed manner to the wheel hub 8 (FIG. 1).

At the other end of the axle body, a corresponding pre-mounted unit can be provided. The axle is a vehicle axle, in particular a rear axle of a towing vehicle or a trailer axle. In particular, the vehicle is a commercial vehicle comprising a brake having a brake disc 11 with a diameter of 15" or more. Especially in the case of the then relatively large disc brakes, the invention is particularly advantageous, since the installation of the disc brake on the vehicle axle is simple.

Figure 6A:
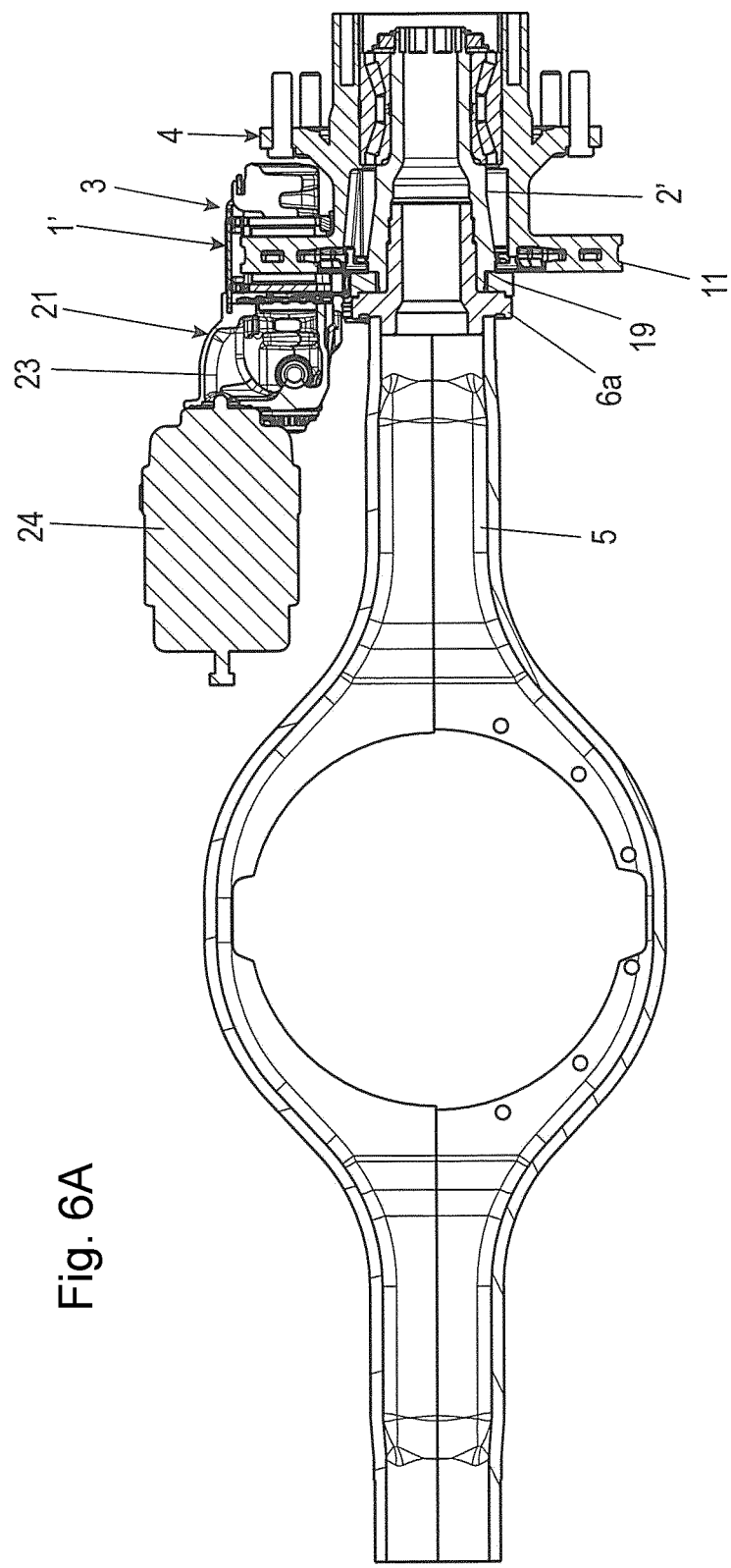
FIG. 6A is a sectional view through an additional arrangement, comprising an additional axle end assembly according to the invention, mounted on an axle body.
Figure 6B:
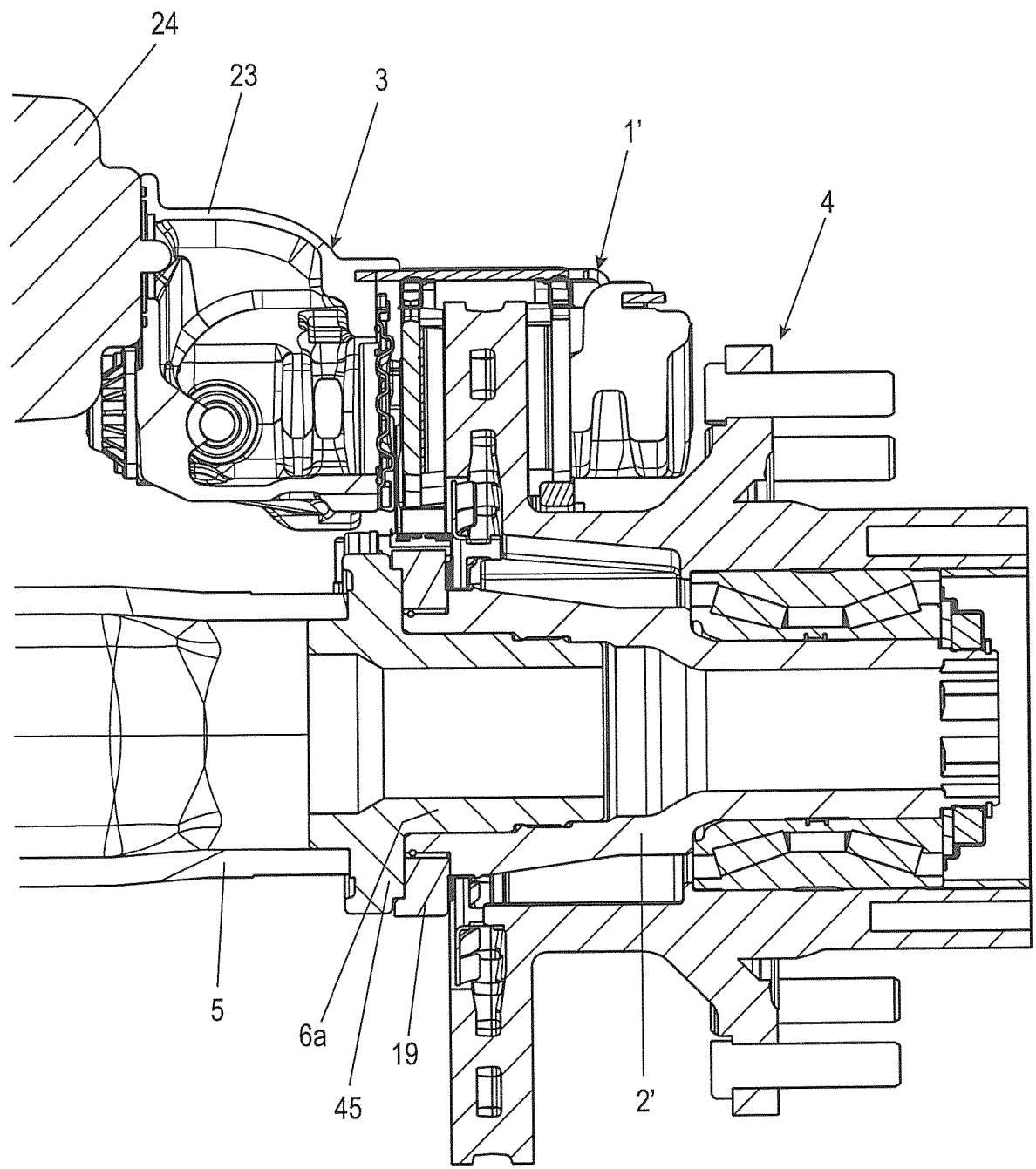
FIG. 6B is an enlarged detail of FIG. 6A.
Figure 7A:
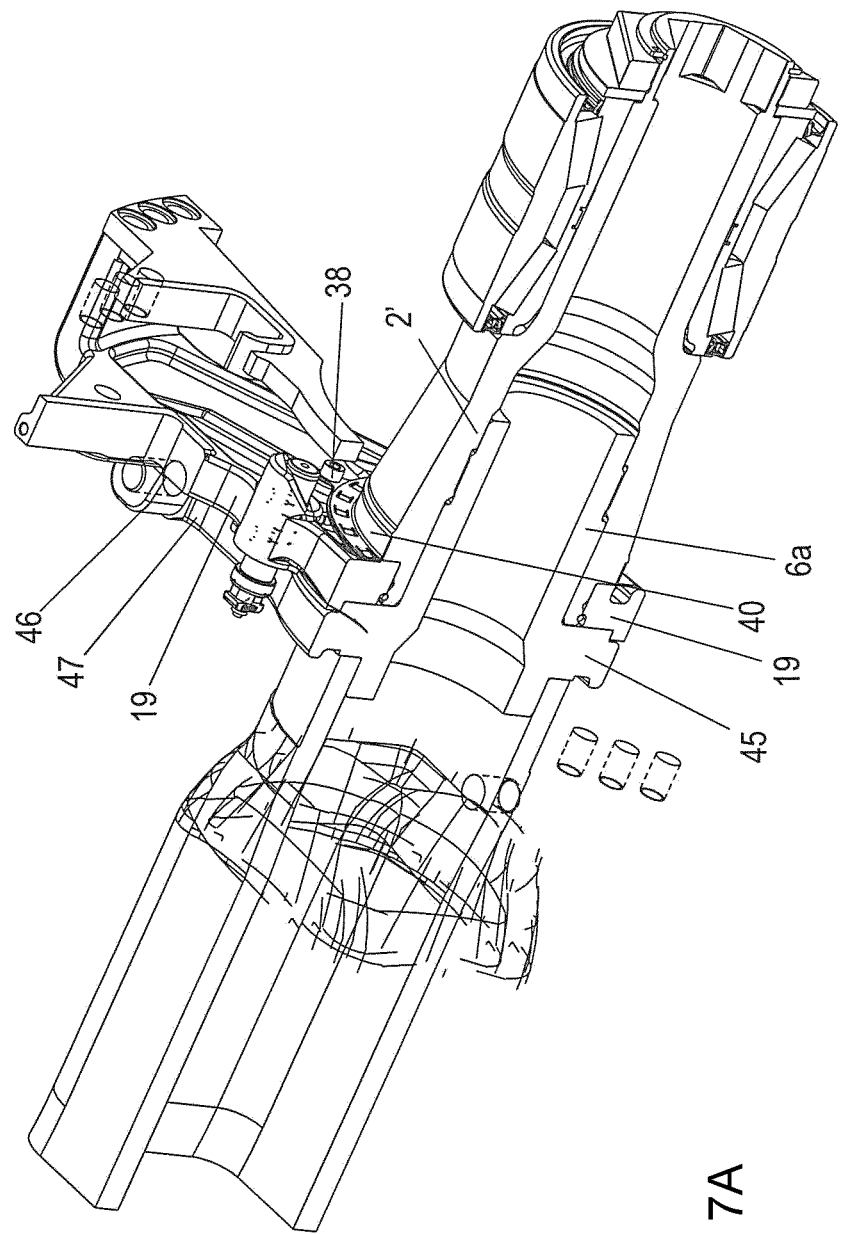
FIG. 7A is a partially sectional perspective view of part of an arrangement in the manner of FIG. 6A.
Figure 7B:
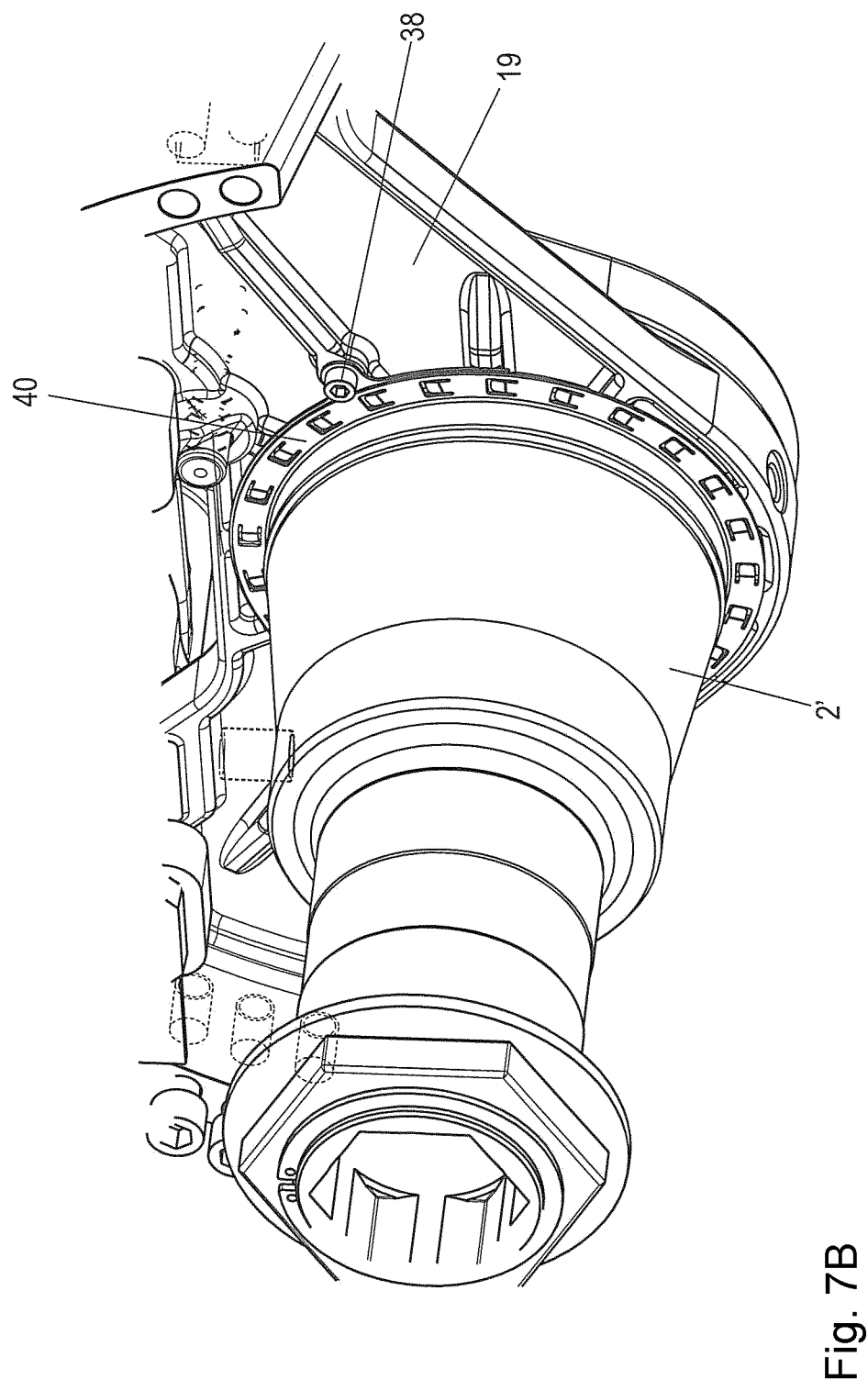
FIG. 7B is an additional perspective view of part of an arrangement in the manner of FIG. 6A.
Figure 7D:
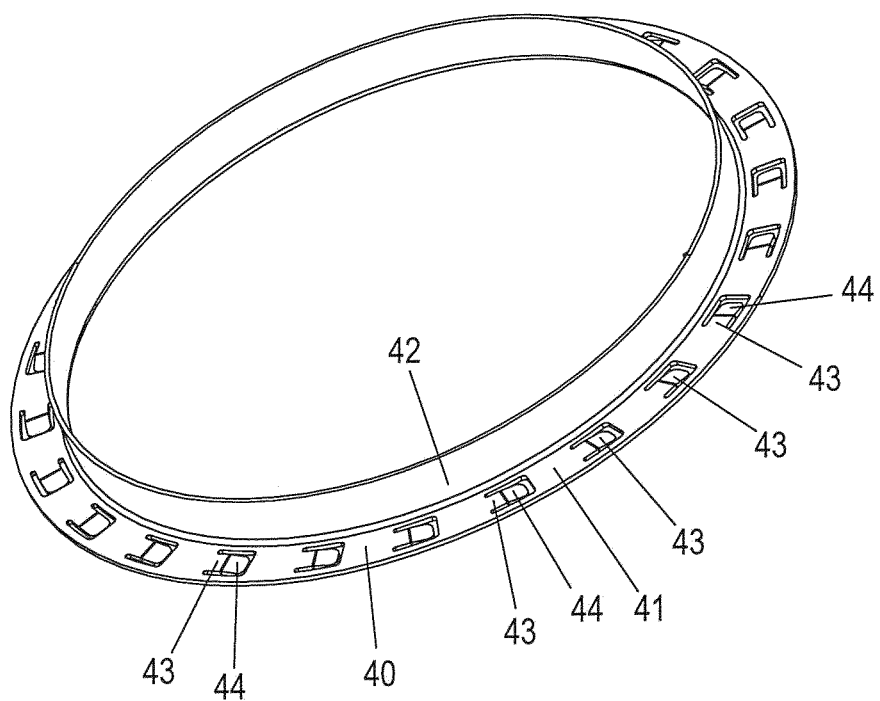

FIGS. 6A and 7A are sectional views through an additional arrangement, comprising an additional axle end assembly 1' according to the invention, mounted on an axle body 5, and FIGS. 6B and 7B are enlarged details from FIGS. 6A and 7A.

This axle end assembly 1 (again also referred to as a "wheel end") is also in the form of a pre-mounted unit which comprises a hollow shaft element 2', on which a wheel brake arrangement 3 and a wheel hub arrangement 4 are arranged.

The hollow shaft element 2' in turn is designed to be connected to a first end 6 of an axle body 5 of a vehicle axle which does not rotate during driving, as can be seen in FIG. 6A.

In this case, the end 6 of the axle body 5 is formed differently in this respect than according to the preceding drawings. Here, a sleeve component 6a is attached to the one or preferably in each case to both axial ends of the axle body 5. In this case, the sleeve component 6a—see also FIG. 6B—is fastened for example by welding to the end of the axle body 5. The sleeve component 6a prolongs the axle body 5 virtually as an axial end or continues said body. This has the advantage, inter alia, that said sleeve part 6a can simply be specifically designed to receive the axle end assembly 1'. Thus—see also FIG. 7A—at least one support ring 45 can be formed on the sleeve part 6a, which part extends radially outwards from the actual inner sleeve region.

The brake adapter 19 is again formed in the manner of a plate which extends substantially radially/perpendicularly to the axial direction Y. The adapter is also used in this case as a brake carrier, on which the brake caliper 23 of the disc brake 21 is arranged. A central nut is not shown in FIGS. 6A and 6B respectively but is preferably provided again in the manner of/analogously to FIG. 1.

The brake adapter 19 can be supported on the sleeve part 6a by at least one interlocking part such as a bolt. Said bolt (not shown) can be oriented for example in the peripheral direction/tangentially and inserted or screwed into holes in webs 46, 47 which rest against one another in the peripheral direction, wherein the one web 46 is an axial web 46 of the brake adapter 19 which rests against a radially protruding web 47 of the support ring 45 and thus of the sleeve part 6a. As a result, a support and securing against rotation of the brake adapter 19 can be achieved on the sleeve part 6a over a relatively large radius in an advantageous and simple manner.

The hollow shaft element 2' overlaps the sleeve part 6a in a concentric, radially outward manner in the end region thereof which points towards the brake adapter 19 and can be screwed onto said sleeve part in a threaded region.

On the brake adapter 19—see FIGS. 7A and 7B—a ring or an annular segment or portion 35—see FIG. 7C—is fastened. For this purpose, one or more—in this case two—tabs 36 are formed on the annular segment 35 so as to be distributed over the periphery. Said tabs protrude radially from the outer periphery of the annular portion 35. Said tabs each comprise a through-hole 37. The through-holes 37 are penetrated by screws 38.

The screws 38 are screwed into corresponding threaded holes (not shown here) in the brake adapter 19. The annular portion 35 is thus fastened to the brake adapter 19 in a simple and secure manner. In the annular portion 35, a plurality of through-openings 39 are further formed so as to be distributed over the periphery or angularly offset, which openings are formed in this case as rectangular slots. In this case, at a distance of a few angular degrees, in each case one of said slots is provided.

The annular portion 35 cooperates with a corresponding annular cup 40 or annular cup segment—see FIG. 7B—which comprises a radially extending annular portion 41 and an axially extending cup/sleeve portion 42 which is internally attached to the annular portion 41. The sleeve portion 42 is fastened to/on the hollow shaft element 2' in a rotationally fixed manner. This fastening can take place in various ways, for example achieved by means of interlocking elements (not shown here) or else for example by an interference fit of the sleeve portion 2' on the hollow shaft element 2'.

The annular portion 41 of the annular cup 40 comprises a plurality of spring bars 43 which are distributed over the periphery and are punched out except for a connection made of the annular portion 41. The spring bars 43 each extend in the same peripheral direction and comprise free ends 44 which are bent out of the plane of the annular portion 41 and protrude axially out of said plane in such a way that said ends engage in the through-openings 39 in the annular portion 35 in a mounted state. The hollow shaft element 2' can thus be rotated in a direction of rotation relative to the brake adapter 19. By contrast, in the other direction of rotation, a ratchet arrangement is produced, and thus very effective securing against rotation is achieved by simple means. This further facilitates the mounting.

LIST OF REFERENCE NUMERALS

| | |
|---|---|
| Axle end assembly | 1, 1' |
| Hollow shaft element | 2, 2' |
| Wheel brake arrangement | 3 |
| Wheel hub arrangement | 4 |
| Axle body | 5 |
| First end | 6 |
| Sleeve component | 6a |
| Second end | 7 |
| Wheel hub | 8 |
| Wheel bearing | 9 |
| Wheel bolt | 10 |
| Brake disc | 11 |
| Holes | 12 |
| Wheel mounting flange | 13 |
| Screws | 14 |
| Holes | 15 |
| Annular shoulder | 16 |
| Torque transmission contour | 17 |
| Spacer tube | 18 |
| Brake adapter | 19 |
| Mounting openings | 20 |
| Disc brake | 21 |
| Brake carrier | 22 |
| Brake caliper | 23 |
| Brake cylinder | 24 |
| Thread | 25 |
| Threaded portion | 25a, b |
| Guide portion | 26 |
| Interface region | 27 |
| Toothing | 28, 29 |

-continued

| | |
|---|---|
| Outer thread | 30 |
| Stop | 31 |
| Central nut | 32 |
| Shoulder | 33 |
| Axle part | 34 |
| Annular segment or portion | 35 |
| Tabs | 36 |
| Through-holes | 37 |
| Screws | 38 |
| Through-openings | 39 |
| Annular cup | 40 |
| Annular portion | 41 |
| Sleeve portion | 42 |
| Spring bars | 43 |
| Free ends | 44 |
| Support ring | 45 |
| Web | 46, 47 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Axle end assembly, comprising:
    a wheel brake arrangement; and
    a wheel hub arrangement having a wheel hub configured to receive a wheel,
    wherein
        the axle end assembly is a pre-mounted unit which has a hollow shaft element on which the wheel brake arrangement and the wheel hub arrangement are arranged,
        the pre-mounted unit is mountable as a whole on an axle body of a vehicle axle,
        the hollow shaft element is configured to be connected to a first end of the axle body, and
        the hollow shaft element has a threaded portion configured to be screwed together with a corresponding threaded portion at the first axial end of the axle body.

2. Axle end assembly according to claim 1, wherein the hollow shaft element, on the side which is opposite the interface to the axle body, comprises a shoulder against which the wheel bearing rests in the mounted state.

3. Axle end assembly according to claim 2, wherein the hollow shaft element, on the side which is opposite the interface to the axle body, further comprises a torque transmission contour.

4. Axle end assembly according to claim 1, wherein the wheel hub arrangement comprises at least one wheel hub and one or more wheel bearings.

5. Axle end assembly according to claim 4, wherein the wheel hub arrangement further comprises a plurality of brake discs and/or a plurality of wheel bolts.

6. Axle end assembly according to claim 5, wherein the pre-mounted unit further comprises a spacer sleeve which is fixed to the hollow shaft element on the wheel hub.

7. Axle end assembly according to claim 1, wherein the wheel brake arrangement of the pre-mounted unit comprises at least one brake adapter for mounting a wheel brake.

8. Axle end assembly according to claim 7, wherein the wheel brake is a disc brake comprising a brake caliper.

9. Axle end assembly according to claim 8,
the disc brake comprises one or both of: a brake carrier and a brake cylinder.

10. Axle end assembly according to claim 7, wherein
the brake adapter is designed as an assembly plate which is penetrated by the hollow shaft element and which extends substantially radially to the hollow shaft element or the axial direction Y thereof.

11. Axle end assembly according to claim 1, wherein
the hollow shaft element is designed to engage in the end of the axle body, and wherein, in addition to the threaded portion, said hollow shaft element comprises at least one guide portion.

12. Axle end assembly according to claim 11, wherein
the hollow shaft element, in addition to the threaded portion, comprises at least one non-threaded guide portion.

13. Axle end assembly according to claim 7, wherein
a direct torque transmission interface is formed between the brake adapter and the axle body.

14. Axle end assembly according to claim 13, wherein
the direct torque transmission interface between the brake adapter and the axle body is formed by accordingly corresponding interlocking elements on these elements which engage with one another during the mounting of the pre-mounted unit on the axle body.

15. Axle end assembly according to claim 13, wherein
the interface between the brake adapter and the axle body is formed integrally by welding.

16. Axle end assembly according to claim 1, wherein
the hollow shaft element comprises an outer thread on the side thereof which is opposite the axle body, and
a stop for the wheel bearing is provided so that a pretension can be applied to the wheel bearing by a central nut on the outer thread.

17. Wheel axle unit, comprising:
an axle end assembly comprising a wheel brake arrangement and a wheel hub arrangement, wherein the axle end assembly is a pre-mounted unit having a hollow shaft element on which the wheel brake arrangement and the wheel hub arrangement are arranged;
a brake adapter of the wheel brake arrangement;
an axle body on which the pre-mounted unit is mounted;
a sleeve component arranged at least partially concentrically within the hollow shaft element and between the brake adapter and the axle body, the sleeve component being attached to the axle body.

18. Wheel axle unit according to claim 17, wherein
between the brake adapter and the hollow shaft element, a ratchet arrangement which locks rotation in one direction is formed.

19. Wheel axle unit according to claim 18, wherein
the hollow shaft element of the pre-mounted unit and the axle body are screwed to one another.

20. Wheel axle unit according to claim 19, wherein
the brake adapter and the axle body are directly or indirectly interconnected via interlocking for the torque transmission.

21. Method for mounting a wheel axle unit on an axle body, the method comprising the acts of:
forming an axle end assembly comprising a wheel brake arrangement and a wheel hub arrangement, wherein the axle end assembly is a pre-mounted unit having a hollow shaft element on which the wheel brake arrangement and the wheel hub arrangement are arranged; and
mounting said pre-mounted unit as a whole on the axle body,
wherein the entire pre-mounted unit is connected to the axle body by connection of screw threads of the axle body with screw threads of the hollow shaft element.

22. Method according to claim 21, wherein
the pre-mounted unit is formed as follows:
in a first mounting step A, a pre-mounting of the wheel hub arrangement to form a pre-mounted unit takes place;
in a second mounting step B, a threading of the wheel hub arrangement from the mounting step A) onto the hollow shaft element takes place, whereby the hollow shaft element then penetrates a central opening in the wheel hub arrangement;
in an additional mounting step D, a threading of a brake adapter belonging to the wheel brake arrangement takes place for mounting a wheel brake;
in an additional mounting step D, a mounting of a wheel brake belonging to the wheel brake arrangement, on the brake adapter takes place.

23. Method according to claim 22, wherein
in a third optional mounting step C between the mounting steps B and C, a threading of a spacer sleeve onto the hollow shaft element takes place.

24. Method according to claim 22, wherein
after the pre-mounting, the entire pre-mounted unit is connected to the axle body.

25. Method according to claim 24, wherein
interlocking devices between the brake adapter and the axle body are brought into engagement with one another.

* * * * *